United States Patent [19]

Nomura et al.

[11] Patent Number: 4,816,501

[45] Date of Patent: Mar. 28, 1989

[54] HEAT-SENSITIVE COLOR DEVELOPABLE COMPOSITION

[75] Inventors: Tomohiko Nomura, Düsseldrof, Fed. Rep. of Germany; Hitoshi Shimizu, Niigata, Japan; Hiroshi Inoue, Niigata; Yoshimi Ishizuka, Niigata; Hiroshi Hirano, Shapporo, Japan

[73] Assignee: Denki Kagaku Kogyo Kabushiki Kaisha, Japan

[21] Appl. No.: 93,402

[22] Filed: Sep. 4, 1987

[30] Foreign Application Priority Data

May 7, 1987 [JP] Japan ................................ 62-109812
May 29, 1987 [JP] Japan ................................ 62-131422

[51] Int. Cl.$^4$ ........................ C08K 3/20; C08L 29/02
[52] U.S. Cl. .................................. 523/406; 523/409; 523/410; 523/426
[58] Field of Search ............... 523/406, 426, 410, 409; 524/548; 525/60

[56] References Cited

U.S. PATENT DOCUMENTS

| | | | |
|---|---|---|---|
| 4,251,593 | 2/1981 | Sakamoto et al. | 427/151 |
| 4,388,362 | 6/1983 | Iwata et al. | 428/913 |
| 4,523,208 | 6/1985 | Barzynski | 427/150 |
| 4,616,239 | 10/1986 | Yahagi et al. | 427/150 |

FOREIGN PATENT DOCUMENTS

| | | | |
|---|---|---|---|
| 61-209203 | 9/1985 | Japan | 525/60 |
| 60-195103 | 10/1985 | Japan | 525/60 |

Primary Examiner—Lewis T. Jacobs
Attorney, Agent, or Firm—Darby & Darby

[57] ABSTRACT

A heat-sensitive color developable composition contains a color developing dye, an acidic material capable of developing the dye by heating and epoxy group-modified polyvinyl alcohol.

26 Claims, No Drawings

HEAT-SENSITIVE COLOR DEVELOPABLE COMPOSITION

BACKGROUND OF THE INVENTION

This invention relates to a heat-sensitive color developable composition. More particularly, it relates to a heat-sensitive color developable composition containing epoxy group-modified polyvinyl alcohol.

A heat-sensitive recording material is usually comprised of a heat-sensitive color developable layer formed on a support or substrate, such as a paper sheet, a plastic film or a metallized paper sheet, and adapted for recording a color developed layer therein by heating. Since recording can be made only by heating, the material is widely used not only for duplicating books or documents but also for computer output or telefax recording and for forming inscriptions on identification certificates, commutation tickets or passenger tickets. Above all, a heat-sensitive recording material mainly composed of an acidic material such as phenol compounds and usually colorless to pale-colored leuco-dyes on a support or substrate is useful because of clear color tone of produced image.

In a heat-sensitive recording material in general, a binder plays an important role in addition to color developing components. When producing the heat-sensitive recording material, leuco-dyes which are color developing agents and a developer, are separately dispersed and pulverized by dispersing devices such as ball mills or sand grinders in separate aqueous media containing water-soluble resins as the binder. The resulting dispersed liquids are mixed together, applied to a support or substrate and dried.

As the binder, water-soluble polymers, such as polyvinyl alcohols, starches, modified materials and derivatives thereof, methyl cellulose, carboxymethyl cellulose, gum arabic, gelatine, polyvinyl pyrrolidone, polyacrylamide, polyacrylate, styrene-maleic anhydride copolymer or isobutyrene/maleic anhydride copolymer, or a high polymer emulsion or latex such as polyvinyl acetate or styrene/butadiene copolymer, are so far known and used.

Above all, polyvinyl alcohols and starches, especially oxidized or etherificated starches, are preferred as the binder, since the properties thereof, such as dispersibility, film strength, color developability, sticking, non-dust adhesion and non-cohesiveness, required as the binder, are more excellent than those of the other materials. However, the properties obtained so far are not fully satisfactory since prolonged heating or recording results in adhesion of dusts to a thermal head due to abrasion of the thermal head or sticking of the head to the heat-sensitive recording paper under conditions of elevated temperatures. In addition, problems are presented such that, because of insufficient water resistance, inadvertent erasure of printed characters or figures, finger stickiness of the film surface or peeling may be caused on contact of the printed recording paper sheet with water or a plasticizer and the image density may be lowered after recording, or the printed image may become completely illegible.

As the water resistant agents for polyvinyl alcohols or starches, it is known to use melamine-formaldehyde condensates, epoxy compounds, glyoxal, chromium alum or glutaraldehyde. However, these water resistant agents are inconvenient in that the coated liquid may cohere or lower in color developability and heat treatment under elevated temperatures is required for obtaining a sufficient water resistance. Above all, heat treatment under elevated temperatures is not desirable since the problem of color development may be presented in the production of the heat-sensitive recording material.

OBJECTS AND SUMMARY OF THE INVENTION

It is a principal object of the present invention to provide a heat-sensitive color developable composition from which a heat-sensitive recording material having excellent water resistant or water proof properties can be made.

It is a further object of the present invention to provide a heat-resistant color developable composition from which a heat-sensitive recording material can be made in which there is no risk of dust adhesion to a thermal head by abrasion with the thermal head or sticking of the thermal head to the heat-sensitive recording material.

It is a further object of the present invention to provide a heat-sensitive color developable composition from which a heat-sensitive recording material can be made which is not liable to stick to the thermal head under conditions of elevated temperatures.

It is another object of the present invention to provide a heat-sensitive color developable composition from which a heat-sensitive recording material can be made in which there is no risk of peeling or finger stickiness of the surface due to water contents.

These and other objects of the present invention will become clear from the following description and illustative examples thereof.

According to the present invention, there is provided a heat-sensitive color developable composition comprising a color developing dye, an acidic material capable of developing the dye by heating and a polyvinyl alcohol modified with an epoxy group.

DESCRIPTION OF THE INVENTION

The present invention will be described further in detail.

As the color developing dye employed in the present invention, any dye employed in the heat-sensitive color developable composition may be used without any limitations. Typical dyes are leuco-compounds such as crystal violet lactone and 3-diethylamino-6-methyl-7-anilinofluoran. However, other leuco-compounds, such as triphenylmethane type leuco-compounds, fluoran type leuco-compounds, phenothiazine type leuco-compounds, oramine type leuco-compounds, spiro-compound type leuco-compounds or indolinophthalide type leuco-compounds, may be employed within the scope of the present invention. These leuco-dyes may be enumerated by, for example, 3,3-bis(p-dimethylaminophenyl)-6-dimethylaminophthalide,
3-3-bis(p-dimethylaminophenyl)phthalide,
3,3-bis(p-dimethylaminophenyl)-6-diethylaminophthalide,
3,3-bis(p-dimethylaminophenyl)-6-chlorophthalide,
3-(N-p-tolyl-N-ethylamino)-6-methyl-7-(N-phenylamino)fluoran, 3-diethylamino-6-methyl-7-anilinofluoran,
3-diethylamino-7-chlorofluoran, 3-diethylamino-7-(3-fluoromethyl)phenylaminofluoran, benzoyl leuco-methylene blue, 6'-chloro-8'-methoxy-benzoindolinopyrylospiran, 6'-bromo-8'-methoxy-benzoindolinopyrylospiran and 2-[3,6-bis(diethylamine)-9-(o-chloroanilino)xanthyl]-benzoic acid lactam.

The acidic materials reacted on heating with these color developing dyes for color development of the dyes may be enumerated by, for example, phenol, p-methylphenol, =-naphthol, β-naphthol, 2,2-bis(p-hydroxyphenyl)propane, also known as Bisphenol A, 2,2-bis(p-hydroxyphenyl)butane, 4,4'-cyclohexylidene diphenol, benzoic acid, salicylic acid, tartaric acid and gallic acid. However, there are no specific limitations on the kind of the color developing dyes or the acidic materials.

The essential feature of the present invention is that epoxy group-modified polyvinyl alcohol is employed as the binder in the heat-sensitive color developable composition. The epoxy group-modified polyvinyl alcohol may be produced by, for example, co-polymerizing a vinyl ester and an epoxy group-containing unsaturated compound represented by the general formula:

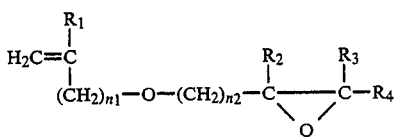

wherein $R_1$, $R_2$, $R_3$ and $R_4$ are hydrogen atoms or alkyl groups $n_1$ is 1 or 2 and $n_2$ is 1, 2 or 3, in the presence of a radical polymerization initiator, and saponificating the thus obtained copolymerized product in alcohol in the presence of an alkali catalyst.

The vinyl esters may include vinyl acetate, vinyl propionate and vinyl formate. Of these, vinyl acetate is most preferred from economic considerations.

The epoxy group-containing unsaturated compounds may include allylglycidylether, methaallylglycidylether, 1-(3-butenyloxy)-2,3-epoxypropane, 1-allyloxy-3,4-epoxybutane, 1-allyloxy-4,5-epoxypentane, 1-allyloxy-3,4-epoxy-3-methylbutane, 1-allyloxy-3,4-epoxy-pentane, 1-allyloxy-3,4-epoxy-3-methylpentane, 1-allyloxy-4,5-epoxy-4-methylpentane, 1-allyloxy-4,5-epoxy-hexane, 1-allyloxy-4,5-epoxy-4-methylhexane, methallylmethylglycidyl ether and methallyldimethylglycidyl ether. Of these, allylglycidylether is most preferred in view of reactivity with vinyl ester and from economic considerations.

The epoxy group content in the epoxy group-modified polyvinyl alcohol is selected preferably in the range of from 0.01 to 20 mol % and more preferably in the range of from 0.01 to 10 mol %. With the content lower than 0.01 mol %, sufficient water resistance is not obtained. With the content higher than 20 mol %, the expected desirable effect is not obtained in proportion to the ratio of modification. It is preferred that the polymerization degree be in the range of from 200 to 3500 and the saponification degree be in the range of from 70 to 100 mol %.

As a third copolymerization component, vinyl esters such as vinyl acetate; α-olefins such as ethylene or propylene; acids such as (meth)acrylic acid, crotonic acid, itaconic acid or fumaric acid, or alkyl esters thereof; (meth)acryl amide; alkylvinyl ether; or 2-acrylamide-2-methylpropane sulfonic acid may be included in an amount such that the properties of the heat-sensitive color developable composition of the present invention, especially water resistance, is not impaired.

It is desirable that the heat-sensitive color developable composition of the present invention be composed of 5 to 30 parts by weight and preferably 10 to 20 parts by weight of the color developing dye, 20 to 80 parts by weight and preferably 40 to 70 parts by weight of the acidic material and 5 to 50 parts by weight and preferably 10 to 30 parts by weight of the epoxy group-modified polyvinyl alcohol.

According to the present invention, the epoxy group-modified polyvinyl alcohol may be used simultaneously with a cross-linking agent thereof. The cross-linking agent herein means mainly a curing agent and a curing catalyst for the epoxy resin. The curing agent for the epoxy resin may include primary and secondary amines, such as n-propylamine, n-butylamine, diethylenetriamine, triethylenetetramine, tetraethylenepentamine, methaxylylenediamine, diethylaminopropylamine, diaminodiphenylmethane, di-n-butylamine, di-isobutylamine, pyperidine or 2-pipecoline; imidazoles such as 2-methylimidazole, 2-ethylimidzole, 4-methylimidazole or 2-phenylimidazole; or liquid polyamide resins. The curing catalyst for the epoxy resin may include tertiary amines such as trimethylamine, triethylamine or tri-n-butylamine; or complex compounds of Lewis acids with amines such as boron trifluoride-ethylamine complex compound. When using these cross-linking agents, it is customary that the agents be previously included along with the aforementioned other constituents into an aqueous dispersion. Therefore, those soluble in water, especially water-soluble amine compounds, are most preferred as the cross-linking agent. It is also possible to use two or more of these cross-linking agents simultaneously. The cross-linking agent is usually employed preferably in an amount of 0.01 to 20 parts by weight of the cross-linking agent to 100 parts by weight of the epoxy group-modified polyvinyl alcohol, although it may vary depending on the kind of the cross-linking agent and the modification degree of the epoxy group-modified polyvinyl alcohol. With the amount of the cross-linking agent less than 0.01 part by weight, its effect as the cross-linking agent is lowered. When the agent is used in an amount higher than 20 parts by weight, the effect of the cross-linking agent is not elevated correspondingly. The use of the cross-linking agent simultaneously with the epoxy group-modified polyvinyl alcohol results in further improved water resistance.

In the heat-sensitive color developable composition of the present invention, an acid group-modified polyvinyl alcohol may be used in addition to the epoxy group-modified polyvinyl alcohol used optionally with the cross-linking agent. In such a case, sufficiently satisfactory quality may be achieved when a high degree of water resistance is required of the heat-sensitive color developable composition as when it is used for a heat-sensitive recording material such as POS or point of sale labels.

As the acid groups introduced into the acid group-modified polyvinyl alcohol employed in the present invention, any acid groups such as carboxyl, sulfonic acid, nitro or phosphoric acid groups may be used singly or in combination without any specific limitations. However, carboxyl and sulfonic acid groups are preferred because of ease in introduction and reactivity with the epoxy group modified polyvinyl alcohol, with carboxylic acid groups being most preferred in view of industrial utility.

The carboxylic acid-modified polyvinyl alcohols may include acrylic acid-, methacrylic acid-, fumaric acid-, crotonic acid-, isocrotonic acid-, 2-pentenoic acid-, hexanoic acid-, octenoic acid-, maleic acid-, itaconic acid-, gluconic acid-, muconic acid-, vinylsalicylic acid or cinnamic acid-modified polyvinyl alcohols.

The sulfonic acid group-modified polyvinyl alcohols may include allylsulfonic acid-, ethylvinylsulfonic acid-, octadecylsulfonic acid- or vinylphenylsulfonic acid-modified polyvinyl alcohols. It is noted that the aforementioned copolymers may include α-olefins such as ethylene or propylene or vinyl ethers as unsaturated monomers other than the acid groups.

These acid group-modified polyvinyl alcohols may be produced by the conventional methods. Although no specific limitations are placed on the degree of modification by the acid groups of the acid group-modified polyvinyl alcohols, it is preferably selected to be in the range from 0.1 to 20 mol percent in view of convenience in manufacture and costs. Although there are no specific limitations in polymerization and saponification degrees, it is preferred that, for convenience in manufacture, the polymerization degree be selected to be in the range from 200 to 3000 and the saponification degree be selected to be in the range from 70 to 100 mol percent.

According to the present invention, when using these acid group-modified polyvinyl alcohol and epoxy group-modified poyvinyl alcohol simultaneously, it is preferred that the epoxy group-modified polyvinyl alcohol be used in 96 to 20 percent by weight and the acid group-modofied polyvinyl alcohol be used in 4 to 80 percent by weight and, more preferably, the epoxy group-modified polyvinyl alcohol be used in 90 to 50 percent by weight and the acid group-modified polyvinyl alcohol be used in 10 to 50 percent by weight.

Other binders may also be used in the heat-sensitive color developable composition of the present invention. These binders may include water-soluble polymers such as polyvinyl alcohols, methyl cellulose, methoxycellulose, hydroxyethylcellulose, carboxymethylcellulose, starches, gelatine, gum arabic, casein, styrene-maleic anhydride copolymer hydrolyzate, styrene-maleic acid anhydride copolymer half ester hydrolyzate, isobutylene-maleic anhydride copolymer hydrolyzate, silica-modified polyvinyl alcohol, polyacrylamide and derivatives thereof, polyvinyl pyrrolidone, polystyrene sulfonic acid, sodium alginate or polyacrylic acid and water-insoluble polymers such as styrene-butadiene rubber latex, acrylonitrile-butadiene rubber latex, methyl acrylate-butadiene rubber latex or vinyl acetate emulsion.

It is also possible to add fine particles of pigments such as zinc oxide, calcium carbonate, barium sulfate, titanium oxide, lithopone, talc, agalmatolite, kaolin, aluminum hydroxide, silica, alumina, magnesia or aluminum stearate to the heat-sensitive color developable composition of the present invention to improve the clarity of the developed images. It is similarly possible to add lubricants such as linseed oil, tung oil, wax, paraffine, paraffine wax, microcrystalline wax, carnauba wax, stearic acid amide, polyethylene wax, polystyrene wax or chlorinated paraffine to the heat-sensitive color developable composition of the present invention to further improve running properties of the thermal head. It is likewise possible to add water resistant agents to the composition. These water resistant agents may include water-soluble condensates such as N-methylolmelamine, urea-formaline, melamine-formaline or benzoguanamine-formaline; dialdehyde compounds such as glyoxal or glutaraldehyde; urethane compounds; epoxy compounds; and inorganic cross-linking agents such as boric acid or borax. Metallic soaps or surface-active agents may also be used in an amount such that the water resistance of the heat-sensitive color developable composition is not lowered. Examples of the metallic soaps may include higher fatty acid salts such as zinc stearate, calcium stearate or aluminum stearate, while examples of the surface-active agents may include sulfosuccinic acid type alkali metal salts and fluorine-containing surface-active agents. It is also possible to add sensitizers, antiblushing agents, light resistance improvers, plasticizer resistance improvers or anti-flocking agents to the heat-sensitive color developable composition if so desired. It is likewise possible to add developing inhibitors for inhibiting development of the ground color or co-developers such as zinc chloride, zinc sulfate, sodium citrate, thioureaguanidine sulfate, sorbitol or saccharose, and shell-life improvers for improving light-, oil- and plasticizer resistance, such as alkyl group-substituted phenols or compounds having plural phenol groups.

In preparing the heat-sensitive color developable composition of the present invention, the color developing dyes and the acidic material are separately introduced into aqueous solutions containing epoxy group-modified polyvinyl alcohol and further occasionally containing acid group-modified polyvinyl alcohol. The resulting mixtures are pulverized along with pigments, waxes and surface active agents and occasionally with other binders, water-resistant agents, sensitizers, antiblushing agents, light resistance improvers, plasticizer resistance improvers and anti-flocking agents in a ball mill, sand mill or attriter for preparing two separate aqueous dispersions. These dispersions are mixed thoroughly to produce a heat-sensitive color developable composition, which is then coated on a support or substrate by any known means such as a roll coater, air knife coater or blade coater and dried in a drier to produce the desired heat-sensitive recording material. The amount of coating is preferably 1 to 20 g/m² and more preferably 3 to 10 g/m². As the support or substrate, paper sheets, plastic films or metallized paper sheets may be usually employed without any limitations.

An overcoat may be applied further on the heat-sensitive recording material obtained by coating the heat-sensitive color developable composition of the present invention on the substrate. In such a case, for improving adaptability of the heat-sensitive recording material to the thermal head, water-resistant agents, light resistance improvers or plasticizer resistance improvers may be further added occasionally to an aqueous solution containing the epoxy group-modified polyvinyl alcohol and occasionally the acid group-modified polyvinyl alcohol, the resulting mixture being then pulverized by any known means such as a ball mill, sand mill or an attriter. The resulting dispersion is then coated on the surface of the heat sensitive recording material by any known means such as a roll coater, air knife coater or blade coater and dried in a drier to produce an overcoat layer. It is prefered that the overcoat layer be applied in an amount of 0.5 to 4.0 g/m². With the coating amount larger than 4.0 g/m², heat sensitivity of the heat-sensitive developable layer is lowered. With the coating amount lower than 0.5 g/m², coatability of the overcoat layer is lowered.

EXAMPLES OF THE INVENTION

The present invention will be described further by referring to specific illustrative examples. It is noted that parts and percentages (%) mean those by weight and that polyvinyl alcohol is abbreviated to PVA.

EXAMPLE 1

(iii) Comparison of finger stickiness by wet finger. The evaluation of hardly sticky was marked O and the evaluation of extremely sticky was marked by X.

(iv) Comparison of the peeling degree of a portion of the coating surface on which a drop of water was previously applied and which was then rubbed five times with fingers. The evaluation almost no peeling was marked with O , the evaluation only slight peeling was marked and the evaluation almost complete peeling was marked X.

The results of evaluation are shown in Table 1.

TABLE 1

| | | Conditions | | Results | | | |
|---|---|---|---|---|---|---|---|
| | Epoxy group unit | Epoxy group (Mol. %) | Saponification degree (Mol. %) | (1) Sticking | (2) Adhering of dust | (3) Finger stickiness | (4) Peeling |
| Ex. | 1 Allyl glycidyl ether | 1.0 | 98 | Non | Non | | |
| | 2 methallyl glycidyl ether | 0.5 | 88 | Slightly observed | Slightly observed | | |
| | 3 1-allyloxy-3,4-epoxybutane | 3.4 | 90 | Non | Non | | |
| | 4 1-(3-butenyloxy)-2,3-epoxypropane | 2.3 | 80 | " | " | | |
| Comp. Ex. | 1 — | — | 98 | Observed | Observed | X | X |

| (liquid A) | |
|---|---|
| crystal violet lactone | 2 parts |
| 10% aqueous solution of epoxy group-modified PVA (containing 1 mol % of allylglycidylether units; saponification degree, 98 mol %; polymerization degree, 1100) | 20 parts |
| water | 28 parts |
| (liquid B) | |
| Bisphenol A | 6 part |
| 10% aqueous solution of epoxy group-modified PVA same as that in liquid A | 20 parts |
| calcium carbonate | 5 parts |
| stearic acid amide | 2 parts |
| water | 27 parts |

The mixtures having the above compositions were pulverized and dispersed separately for 24 hours in ball mills to produce the liquids A and B which were then mixed together to obtain a heat-sensitive color developable liquid coating material.

The coating liquid was applied to one side of a high-quality paper sheet having a basic weight of 50 g/m². The paper sheet thus treated was dried to give a thermal paper with a coating amount of 5 g/m².

EXAMPLES 2 to 4

Thermal papers were produced in the same was as in the Example except that the epoxy group units, epoxy group contents and the saponification degrees were changed as shown in Table 1.

COMPARATIVE EXAMPLE 1

Thermal paper was produced in the same way as in the Example 1 except that completely saponificated PVA having a saponification degree of 98 mol % and a polymerization degree of 1100 was used in place of epoxy group-modified PVA.

The respective thermal papers thus obtained were compared with one another in the following manner with respect to sticking and water resistance.

(i) and (ii) Comparison of sticking to a thermal head i) and comparison of adhesion of dust (debris or droppings from the surface of the thermal paper) to the thermal head when recording is made using a telecopier machine OKI FAX 7100 manufactured by Oki Denki KK.

| (liquid A) | |
|---|---|
| crystal violet lactone | 2 parts |
| 10% aqueous solution of epoxy group-modified PVA (containing 1 mol % of allylglycidylether units; saponification degree, 98 mol %; polymerization degree, 1100) | 20 parts |
| diethylaminopropylamine (previously dissolved in the above aqueous solution of modified PVA | 0.01 part (0.5% to modified PVA) |
| water | 28 parts |
| (liquid B) | |
| Bisphenol A | 6 parts |
| 10% aqueous solution of epoxy group-modified PVA same as that in liquid A | 20 parts |
| diethylaminopropylamine (previously dissolved in the above aqueous solution of modified PVA) | 0.01 part (0.5% to modified PVA) |
| calcium carbonate | 5 parts |
| stearic acid amide | 2 parts |
| water | 27 parts |

The mixtures having the above compositions were pulverized and dispersed for 24 hours in ball mills to produce a liquid A and a liquid A. These liquids were mixed together to provide a heat-sensitive color developable coating liquid.

The coating liquid was applied to one side of a high quality paper sheet with a basic weight of 50 g/m² and the paper sheet thus treated was dried to obtain a thermal paper with a coating amount of 5 g/m².

EXAMPLES 6 TO 8

Thermal papers were produced in the same way as in Example 5 except that the epoxy group units, the contents of the epoxy group units and the saponification degrees of the epoxy group-modified PVA employed in Example 5 were changed as shown in Table 2.

Each of the thermal papers thus produced was evaluated with respect to sticking and water resistance. The results are shown in Table 2, from which it is seen that the thermal paper of the present invention has excellent properties.

TABLE 2

| | PVA | | | | Results | | | |
|---|---|---|---|---|---|---|---|---|
| | Epoxy group unit | Epoxy group (Mol. %) | Saponification degree (Mol. %) | Cross linking agent (0.01 part) | Water resistance *1 | Water resistance *2 | Sticking | Adhering of dust |
| Ex. 5 | Allyl glycidyl ether | 1.0 | 98 | Diethylamino propyl amine | | | Non | Non |
| 6 | Methallyl glycidyl ether | 0.8 | 98 | Diethylamino propyl amine | | | '' | '' |
| 7 | 1-allyloxy-3,4-epoxybutane | 2.2 | 96 | Diethylamino propyl amine | | | '' | '' |
| 8 | 1-(3-butenyloxy)-2,3-epoxypropane | 2.4 | 94 | Diethylamino propyl amine | | | '' | '' |

*1 A drop of warm water was applied to a portion of the coated surface, which portion was then rubbed ten times with fingers and comparison was made with respect to stickiness and the degree of peeling of the coated surface.
*2 The above finger rubbing was reported after immersion in water for 2 hours.
For evaluation of *1 and *2, the evaluation no stickiness and no peeling was marked , the evaluation rather sticky and slight peeling was marked Δ and the evaluation extremely sticky and considerable peeling was marked X.

EXAMPLE 9

For carrying out the following Examples, the acid group-modified PVA shown in Table 3 and the epoxy group-modified PVA shown in Table 4 were prepared for trial. The acid group units shown in Table 3, vinyl acetate, methanol and 2,2'-azobisbutyronitrile were charged together in a 5-liter separable flask and subjected to a boiling point polymerization in a bath of lukewarm water. Into each of the resulting pasty polymers was blown a methanol vapor produced in a methanol vaporizer to carry out monomer removal until the specific weight of the liquid distillate was equal to that of methanol. This pasty polymer was charged into a 30-liter kneader and subjected to a saponification reaction at a constant temperature of 30° C. using a caustic soda/methanol solution as a saponification catalyst.

The thus produced PVA/methanol suspension was processed in a centrifugal dryer and dried in a drier to produce the desired acid group-modified PVA.

It is noted that, in preparing samples A-03 and A-04 of the acid group-modified PVA, 5 mol % of dimethyl ester of maleic acid and 6 mol % of acrylamide were charged separately in reaction vessels to carry out polymerization, monomer removal and saponification, followed by hydrolysis by a caustic soda/methanol solution to produce the desired acid group-modified PVA. The amount of the acid groups in each of the polymers was found by infrared spectroscopic analysis and indicated in Table 3.

The epoxy group-modified PVA was also produced using epoxy group units indicated in Table 4 by the method similar to that used for producing the acid group-modified PVA. However, in producing the epoxy group-modied PVA, each of the products obtained after the termination of saponification was processed in a centrifugal dryer for solvent removal and dried preliminarily until the volatile component was equal to 35%, the thus dried product being then dissolved immediately to produce the desired aqueous solution of the epoxy group-modified PVA.

TABLE 3

| | Acid group-modified PVA | | | |
|---|---|---|---|---|
| | Acid group nuit | Modified amount (Mol. %) | Polymerization degree | Saponification degree (Mol. %) |
| A-01 | Acrylic acid | 3.2 | 730 | 90.3 |
| A-02 | Maleic acid | 1.9 | 1050 | 93.7 |
| A-03 | Hydrolyzed product of dimethyl maleate | 3.5 | 620 | 88.4 |
| A-04 | Hydrolyzed product of acrylamide | 4.9 | 930 | 82.1 |
| A-05 | Allylsulfonic acid | 2.3 | 1210 | 91.4 |

TABLE 4

| | Epoxy group-modified PVA | | | |
|---|---|---|---|---|
| | Expoxy group nuit | Modified amount (Mol. %) | Polymerization degree | Saponification degree (Mol. %) |
| E-01 | Allyl glycidyl ether | 2.1 | 1100 | 96.3 |
| E-02 | Allyl glycidyl ether | 4.8 | 850 | 92.0 |
| E-03 | Methallyl glycidyl ether | 3.1 | 720 | 94.2 |
| E-04 | 1-(3-butenyloxy)-2,3-epoxypropane | 1.6 | 1320 | 98.1 |
| E-05 | 1-allyloxy-3,4-epoxybutane | 2.3 | 1000 | 95.2 |

The sample A-01 of the acid group-modified PVA indicated in Table 3 and the sample E-01 of the epoxy group-modified PVA indicated in Table 4 were mixed in a mixing ratio shown in Table 5 to prepare a 10% aqueous solution. The following liquid dispersions A, B, C and D, namely,

| (liquid A) | |
|---|---|
| crystal violet lactone | 10 parts |
| mixed 10% aqueous solution of epoxy group-modified PVA/acid group modified PVA | 10 parts |
| water | 30 parts |
| (liquid B) | |
| Bisphenol A | 25 part |
| mixed 10% aqueous solution of epoxy group-modified PVA/acid group modified PVA | 25 parts |
| water | 50 parts |
| (liquid C) | |
| zinc stearate | 10 parts |
| mixed 10% aqueous solution of epoxy group-modified PVA/acid group-modified PV | 30 parts |
| water | 35 parts |
| (liquid D) | |
| calcium carbonate | 30 parts |
| mixed 10% aqueous solution of epoxy group-modified PVA/acid group-modified PVA | 15 parts |

| water | 55 parts |
|---|---| were pulverized and mixed for one hour in a sand mill to adjust the mean particle size to 2 to 3 microns. The liquids A, B, C and D were mixed together at a mixing ratio of A:B:C:D equal to 5:13:8:5.5 in weight parts and the resulting mixture was further mixed with 14 parts of water. The resulting product was mixed thoroughly to obtain a homogeneous coating liquid. The liquid was then applied to a paper sheet having a basic weight of 5 g/m² by a coating rod so that a dry coating amount was equal to 5 g/m². The paper sheet thus processed was dried in a drier maintained at 50° C. to produce a heat-sensitive recording material.

Simultaneously, a 10% aqueous solution of epoxy group-modified PVA and acid group-modified PVA having a mixing ratio shown in Table 5 was admixed with water to provide a 4% aqueous solution, which was then formed into films by casting on a glass plate.

EXAMPLE 10

A heat-sensitive recording material and a cast film were prepared in the same way as in Example 9 except that the sample A-01 of the acid group-modified PVA indicated in Table 3 was mixed with the sample E-02 of the epoxy group-modified PVA to produce a 10% aqueous solution.

EXAMPLES 11 TO 15

Each of heat-sensitive recording materials and cast films were obtained in the same way as in Example 9 except that, when mixing the acid group-modified PVA indicated in Table 3 and the epoxy group-modified PVA indicated in Table 4, the sample A-02 was mixed with the sample E-03 in Example 11, the sample A-03 was mixed with the sample E-04 in Example 12, the sample A-01 was mixed with the sample E-05 in Example 13, the sample A-04 was mixed with the sample E-02 in Example 14 and the sample A-05 was mixed with the sample E-02 in Example 15, in respective mixing ratios indicated in Table 5 to produce 10% aqueous solutions.

TABLE 5

|  |  | Epoxy group-modified PVA (1) | Acid group-modified PVA (2) | Mixing ratio of (1)/(2) | Evaluation of heat-sensitive recording material Wet rub | Percentage of dissolved film (%) |
|---|---|---|---|---|---|---|
| Ex. | 9 | E-01 | A-01 | 90/10 |  | 27 |
|  | 10 | E-02 | A-01 | 60/40 |  | 32 |
|  | 11 | E-03 | A-02 | 92/8 |  | 30 |
|  | 12 | E-04 | A-03 | 91/9 | Δ | 34 |
|  | 13 | E-05 | A-01 | 80/20 |  | 26 |
|  | 14 | E-02 | A-04 | 84/16 |  | 21 |
|  | 15 | E-02 | A-05 | 70/30 |  | 25 |

In the above Table 5, evaluation of each of the heat-sensitive recording materials was made in the following manner. First, in evaluating the WET RUB, 1 ml of pure water was applied dropwise on the surface of each of the heat-sensitive recording materials obtained in Examples 9 to 15 and the surface was rubbed ten times strongly with fingers. The above test was repeated five times. The surface was observed visually for evaluation and the mean results were obtained as indicated in Table 5. In Table 5, the evaluation no changes was marked by O, the evaluatiuon no changes but slightly slimy was marked by Δ and the evaluation powder debris from the heat-sensitive recording layer was marked by X.

In evaluating the percentage of dissolved film, the cast films obtained in the Examples 9 to 15 were immersed in water bath of 40° C. for 12 hours, after having been allowed to stand for 10 days at 20° C. and the relative humidity of 60%. These films were then taken out of water and thoroughly dried by being allowed to stand for 8 hours in a drier maintained at 105° C. The percentage of dissolved film was obtained by the following formula:

$$\text{percentage of dissolved film \%} = \frac{W1 - W2}{W1} \times 100$$

wherein W1 and W2 denote the film weight (g) before and after immersion in water, respectively.

Examples 16 To 18

| (liquid A) | |
|---|---|
| crystal violet lactone | 2 parts |
| 10% aqueous solution of epoxy group-modified PVA shown in Table 6 | 20 parts |
| cross-linking agent shown in TABLE 6 | 0.01 part (0.5% to modified PVA) |
| water | 28 parts |
| (liquid B) | |
| Bisphenol A | 6 parts |
| 10% aqueous solution of epoxy group-modified PVA same as that of liquid A | 20 parts |
| cross-linking agent shown in Table 6 | 0.01 part (0.5% to modified PVA) |
| calcium carbonate | 5 parts |
| stearic acid amide | 2 parts |
| water | 27 parts | were pulverized and dispersed in ball mills for 24 hours to produce the liquids A and B, which were then mixed together to produce heat-sensitive color developable coating liquids.

Each of the coating liquids was coated on one side of a high quality paper sheet having a basic weight of 50 g/m². The thus processed paper sheet was then dried to produce a thermal paper having a coating amount of 5 g/m².

EXAMPLE 19 TO 21

The epoxy group-modified PVA and the acid group-modified PVA indicated in Table 6 were mixed together with a mixing ratio indicated in Table 6 to obtain each of 10% aqueous solutions to produce the thermal paper in the same way as in Examples 16 to 18.

COMPARATIVE EXAMPLES 2 AND 3

Each of thermal papers was obtained in the same way as in Examples 16 to 18 except using the acid group-modified PVA indicated in Table 6.

3-(N-p-tolyl-N-ethylamino)-6-methyl-7-(N-phenylamino)fluoran, 3-diethylamino-6-methyl-7-anilinofluoran,
3-diethylamino-7-chlorofluoran,
3-diethylamino-7-(3-fluoromethyl)phenylaminofluoran, benzoylleuco-methylene blue,
6'-chloro-8'-methoxy-benzoindolinopyrylospiran,

TABLE 6

| | | Epoxy group-modified PVA(1) | Acid group-modified PVA(2) | Mixing ratio of (1)/(2) | Cross linking agent(Amount) | Results | | | | |
|---|---|---|---|---|---|---|---|---|---|---|
| | | | | | | Percentage of dissolved film (%) | Water resistance *1 | Water resistance *2 | Sticking | Adhering of dust |
| Ex. | 16 | E-01 | — | 100 | Diethylamino propyl amine (0.01 wt part) | 12 | | | Non | Non |
| | 17 | E-02 | — | 100 | Tetraethylene pentamine (0.01 wt part) | 10 | | | " | " |
| | 18 | E-03 | — | 100 | Diaminodiphenyl methane (0.01 wt part) | 15 | | | " | " |
| | 19 | E-01 | A-01 | 90/10 | Diethylamino propyl amine (0.01 wt part) | 4 | | | " | " |
| | 20 | E-03 | A-02 | 92/8 | Tetraethylene pentamine (0.01 wt part) | 5 | | | " | " |
| | 21 | E-04 | A-03 | 91/9 | Diaminodiphenyl methane (0.01 wt part) | 6 | | | " | " |
| | 22 | E-01 | — | 100 | Tetraethylene pentamine (0.01 wt part) | 15 | | | " | " |
| Comp. Ex. | 2 | — | A-03 | 100 | — | 100 | X | X | Observed | Observed |
| | 3 | — | A-04 | 100 | — | 100 | X | X | " | " |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A heat-sensitive color developable aqueous composition comprising a color developing dye, an acidic material capable of developing said dye by heating and a polyvinyl alcohol modified with 0.01 to 20 mol % of an epoxy group.

2. A heat-sensitive color developable aqueous composition according to claim 1 wherein said color developing dye is selected from the group consisting of crystal violet lactone and 3-diethylamino-6-methyl-7-anilinofluoran.

3. A heat-sensitive color developable aqueous composition according to claim 1 wherein said leuco-dye is selected from the group consisting of triphenylmethane-, fluoran-, phenothiazine-, oramine-, spiro compound- and indolinophthalide- type leuco-compounds.

4. A heat-sensitive color developable aqueous composition according to claim 2 wherein said leuco-dye is selected from the group consisting of
3,3-bis(p-dimethylaminophenyl)-6-dimethylaminophthalide,
3,3-bis(p-dimethylaminophenyl)phthalide,
3,3-bis(p-dimethylaminophenyl)-6-diethylaminophthalide,
3,3-bis(p-dimethylaminophenyl)-6-chlorophthalide,
6'-bromo-8'-methoxy-benzoindolinopyrylospiran and 2-[3,6-bis(diethylamine)-9-(o-chloroanilino)xanthyl]benzoic acid lactam.

5. A heat-sensitive color developable aqueous composition according to claim 1 wherein said acidic material is selected from the group consisting of phenol, p-methylphenol, α-naphthol, β-naphthol, 2,2-bis(p-hydroxyphenyl)propane, 2,2-bis(p-hydroxyphenyl)butane, 4,4'-cyclohexylidene diphenol, benzoic acid, salicylic acid, tartaric acid and gallic acid.

6. A heat-sensitive color developable aqueous composition according to claim 1 wherein said polyvinyl alcohol modified with the epoxy group is obtained by copolymerizing a vinyl ester and an epoxy group-containing unsaturated compound represented by the formula:

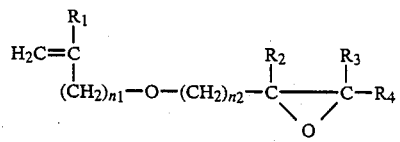

wherein $R_1$, $R_2$, $R_3$ and $R_4$ are hydrogen atoms or alkyl groups, $n_l$ is an integer of 1 or 2 and $n_2$ is an integer of 1, 2 or 3, in the presence of a radical polymerization initiator to produce a copolymer and saponificating said copolymer.

7. A heat-sensitive color developable aqueous composition according to claim 6 wherein said vinyl ester is selected from the group consisting of vinyl acetate, vinyl propionate and vinyl formate, 8. A heat-sensitive color developable aqueous composition according to claim 6 wherein said epoxy group-containing unsaturated compound is selected from the group consisting of allylglycidylether, methaallylglycidylether, 1-(3-butenyloxy)-2,3-epoxypropane, 1-allyloxy-3,4-epoxybutane, 1-allyloxy-4,5-epoxypentane, 1-allyloxy-3,4-epoxy-3-methylbutane, 1-allyloxy-3,4-epoxy-pentane, 1-allyloxy-3,4-epoxy-3-methylpentane, 1-allyloxy-4,5-epoxy-4-methylpentane, 1-allyloxy-4,5-epoxyhexane, 1-allyloxy-4,5-epoxy-4-methylhexane, methaallylmethylglycidyl ether and methaallyldimethylglycidyl ether.

9. A heat-sensitive color developable aqueous composition according to claim 1 wherein said polyvinyl alcohol modified with the epoxy group has a polymerization degree of 200 to 3500 and a saponification degree of 70 to 100 mol %.

10. A heat-sensitive color developable aqueous composition according to claim 1 containing 5 to 30 parts by weight of said color developing dye, 20 to 80 parts by weight of said acidic material and 5 to 50 parts by weight of said polyvinyl alcohol modified with the epoxy group.

11. A heat-sensitive color developable aqueous composition according to claim 1 further comprising a cross-linking agent for said epoxy group-modified polyvinyl alcohol.

12. A heat-sensitive color developable composition according to claim 11 wherein said cross-linking agent is selected from the group consisting of a curing catalyst and a curing agent for epoxy resin.

13. A heat-sensitive color developable aqueous composition according to claim 12 wherein said curing agent for epoxy resin is selected from the group consisting of n-propylamine, n-butylamine, diethylenetriamine, triethylenetetramine, tetraethylenepentamine, methaxylylenediamine, diethylaminopropylamine, diaminodiphenylmethane, di-n-butylamine, di-isobutylamine, pyperidine, 2-pipecoline, 2-methylimidazole, 2-ethylimidazole, 4-methylimidazole, 2-phenylimidazole and liquid polyamide resins.

14. A heat-sensitive color developable aqueous composition according to claim 12 wherein said curing catalyst for epoxy resin is selected from the group consisting of trimethylamine, triethylamine, tri-n-butylamine and boron trifluoride-ethylamine complex compound.

15. A heat-sensitive color developable aqueous composition according to claim 11 containing 100 parts by weight of said polyvinyl alcohol modified with the epoxy group and 0.01 to 20 parts by weight of said cross-linking agent.

16. A heat-sensitive color developable aqueous composition according to claim 1 further comprising acid group-modified polyvinyl alcohol.

17. A heat-sensitive color developable aqueous composition according to claim 16 wherein said acid group is selected from the group consisting of carboxyl group, sulfonic acid group, nitro group, phosphoric acid group and a mixture thereof.

18. A heat-sensitive color developable aqueous composition according to claim 17 wherein said acid group comprising carboxyl group is selected from acrylic acid, methacrylic acid, fumaric acid, crotonic acid, isocrotonic acid, 2-pentenoic acid, hexanoic acid, octenoic acid, maleic acid, itaconic acid, gluconic acid, muconic acid, vinylsalicylic acid, cinnamic acid and a mixture thereof.

19. A heat-sensitive color developable aqueous composition according to claim 17 wherein said acid group comprising sulfonic group is selected from the group consisting of allylsulfonic acid, ethylvinylsulfonic acid, octadecylsulfonic acid, vinylphenylsulfonic acid and a mixture thereof.

20. A heat-sensitive color developable aqueous composition according to claim 16 wherein said acid group-modified polyvinyl alcohol has acid group contents of 0.1 to 20 mol %.

21. A heat-sensitive color developable aqueous composition according to claim 16 wherein said acid group-modified polyvinyl alcohol has a polymerization degree of 200 to 3000 and a saponification degree of 70 to 100 mol %.

22. A heat-sensitive color developable aqueous composition according to claim 16 comprising 96 to 20 wt. % of said epoxy group-modified polyvinyl alcohol and 4 to 80 wt. % of said acid group-modified polyvinyl alcohol.

23. A heat-sensitive color developable aqueous composition according to claim 1 further comprising water-soluble and/or-insoluble polymers.

24. A heat-sensitive color developable aqueous composition according to claim 1 further comprising an additive selected from the group consisting of fine particles of pigments, water-resistant agent, metallic soaps, surface-active agents and a mixture thereof.

25. A heat-sensitive color developable aqueous composition according to claim 1 further comprising an additive selected from the group consisting of a sensitizer, anti-blushing agent, light resistance improver, plasticizer resistance improver, anti-flocking agent and a mixture thereof.

26. A heat-sensitive color developable aqueous composition according to claim 1 further comprising an additive selected from the group consisting of a developing inhibitor, co-developer, shell-life improver and a mixture thereof.

* * * * *